United States Patent [19]
Chang

[11] Patent Number: 5,307,466
[45] Date of Patent: Apr. 26, 1994

[54] DISTRIBUTED PROGRAMMABLE PRIORITY ARBITRATION

[75] Inventor: Robert W. Chang, Oakton, Va.

[73] Assignee: International Business Machines Corporation, Armonk, N.Y.

[21] Appl. No.: 876,239

[22] Filed: Apr. 30, 1992

[51] Int. Cl.⁵ .......................................... G06F 13/374
[52] U.S. Cl. ........................ 395/325; 364/DIG. 1; 364/242.6; 364/242.92; 364/242.8; 364/259.2
[58] Field of Search ................................ 395/325, 725

[56] References Cited

U.S. PATENT DOCUMENTS

| | | | |
|---|---|---|---|
| 4,320,457 | 3/1982 | Tanikawa | 395/325 |
| 4,320,467 | 3/1982 | Glass | 395/325 |
| 4,334,288 | 6/1982 | Booher | 395/325 |
| 4,375,639 | 3/1983 | Johnson, Jr. | 395/325 |
| 4,400,771 | 8/1983 | Suzuki et al. | 364/200 |
| 4,511,959 | 4/1985 | Nicolas et al. | 395/325 |
| 4,536,839 | 8/1985 | Shah et al. | 364/200 |
| 4,621,342 | 11/1986 | Capizzi et al. | 395/325 |
| 4,626,843 | 12/1986 | Szeto et al. | 370/85.2 |
| 4,701,845 | 10/1987 | Andreasen et al. | 364/200 |
| 4,745,548 | 5/1988 | Blahut | 395/325 |
| 4,788,640 | 11/1988 | Hansen | 364/200 |
| 4,791,562 | 12/1988 | Shima | 395/200 |
| 4,799,148 | 1/1989 | Nishioka | 364/200 |
| 4,814,974 | 3/1989 | Narayanan et al. | 364/200 |
| 4,860,000 | 8/1989 | Kobayashi | 370/85.2 |
| 4,920,486 | 4/1990 | Nielson | 395/325 |
| 4,953,081 | 8/1990 | Feal et al. | 364/200 |
| 4,987,529 | 1/1991 | Craft et al. | 364/200 |
| 5,101,482 | 3/1992 | Kipnis | 395/325 |

OTHER PUBLICATIONS

*IBM Technical Disclosure Bulletin* vol. 27, No. 4A Sep. 1984 "Dynamic Priority Manager Under Application Program Control", A. Couder, et al.

*Primary Examiner*—Debra A. Chun
*Attorney, Agent, or Firm*—Mark A. Wurm

[57] ABSTRACT

A distributed arbitration scheme for a communications bus wherein the bus interface modules decide among themselves who should next use the bus. The protocol is a common multiprocessor backplane bus interface for supporting multiprocessing, shared memory, and memory mapped input/output operations. The protocol allows programmable priority which can be changed during system operation. The architecture handles interrupts over the bus and therefore eliminates separate interrupt lines. The scheme can implemented in CMOS technology and is compatible with other integrate circuit device technology.

3 Claims, 4 Drawing Sheets

FIG. 3a
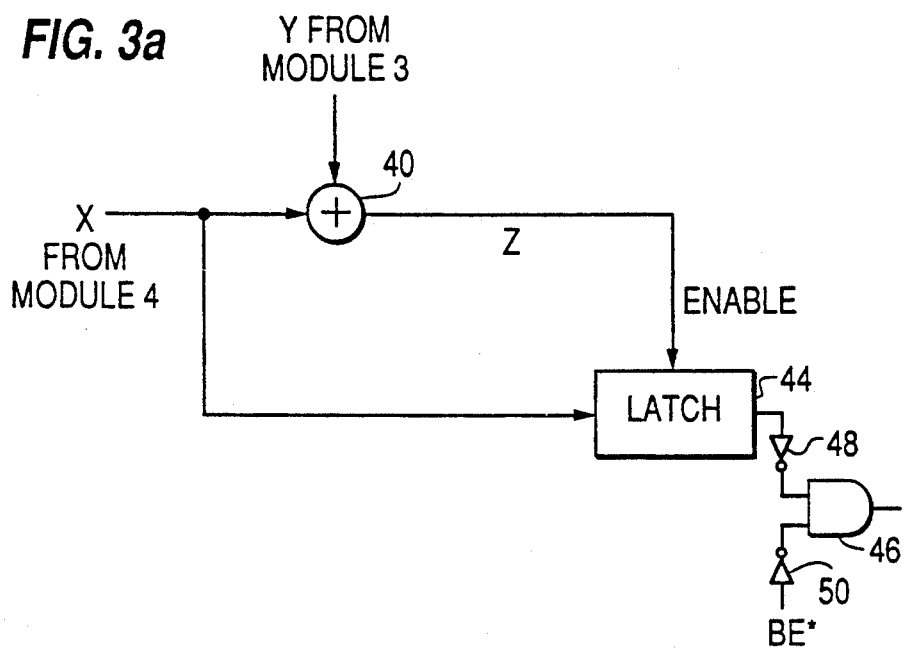
FIG. 3b
| X | Y | Z | ACTION |
|---|---|---|---|
| 0 | 0 | 0 | COMPARE NEXT BIT |
| 1 | 1 | 0 | COMPARE NEXT BIT |
| 0 | 1 | 1 | STORE X = 0 |
FIG. 4d
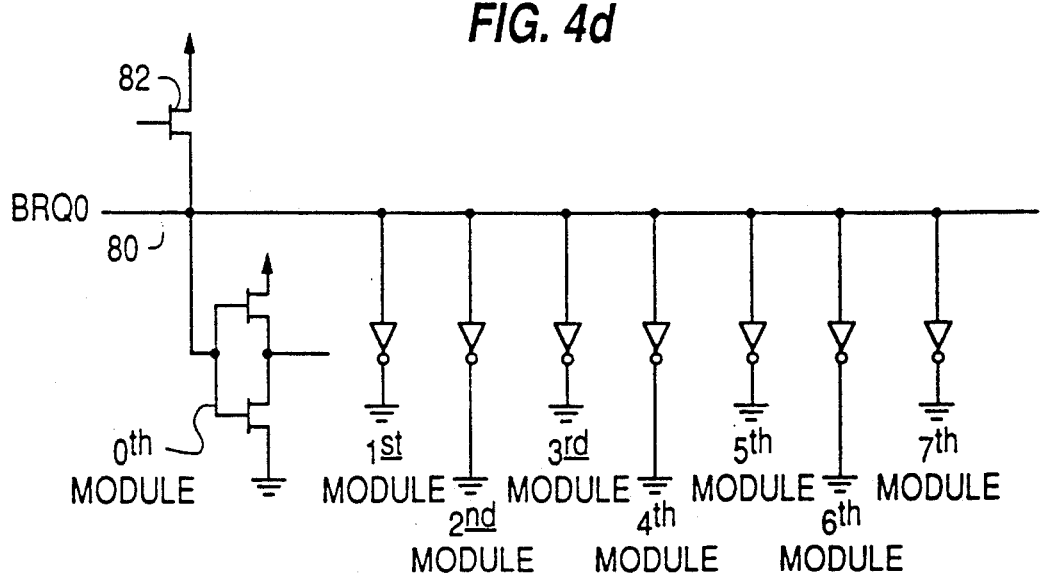

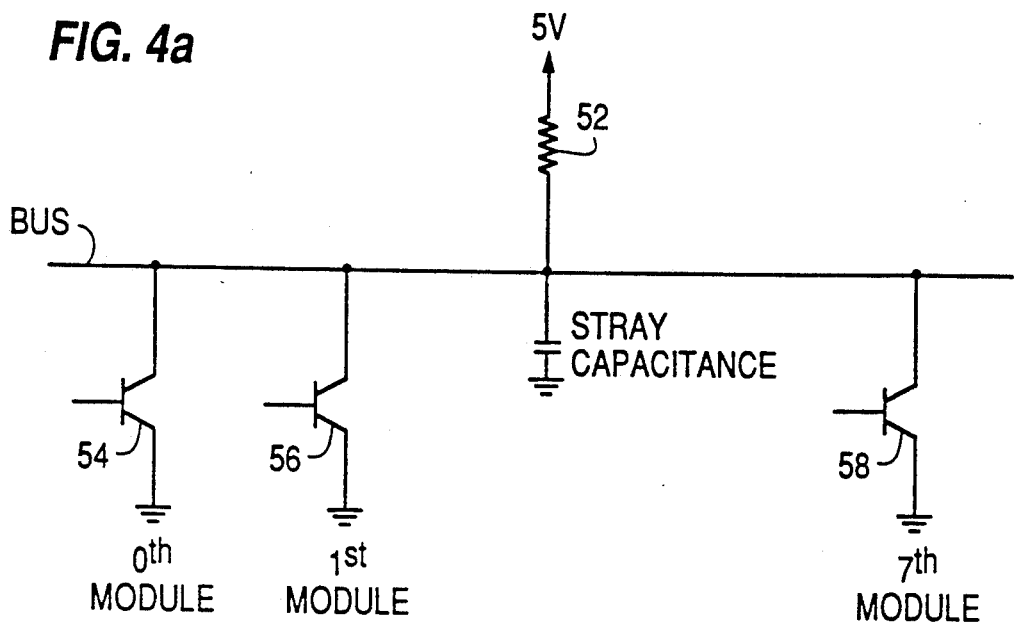
FIG. 4a
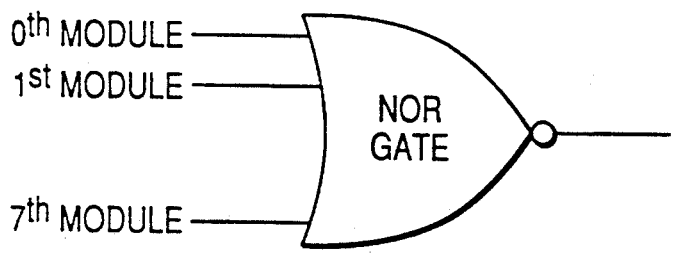
FIG. 4b
FIG. 4c
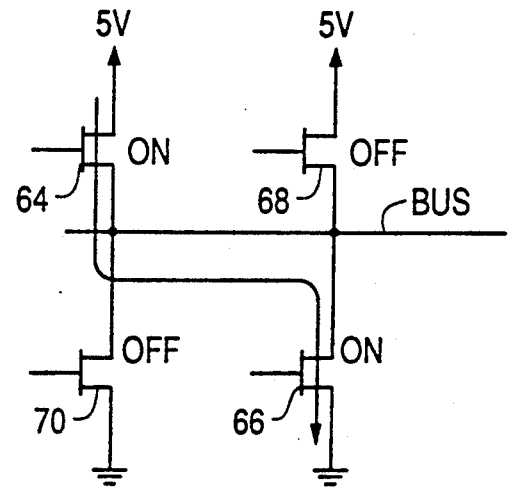

DISTRIBUTED PROGRAMMABLE PRIORITY ARBITRATION

BACKGROUND OF THE INVENTION

1. Field of the Invention

The invention is related generally to multiprocessing computer systems and more particularly to the selection of one of a plurality of processors to communicate on a common communications bus.

2. Background Art

Multiprocessing techniques have become widely used in computing systems. Essentially, multiprocessing systems employ a plurality of processing devices operating substantially independent from one another to thereby enable the computing system to simultaneously accomplish a variety of different tasks.

Rather than provide each of the processors with a complete independent computing system having inputs, processing, and storage along with outputs, a plurality of processors are interconnected by a single communications bus.

In computer systems, design tradeoffs in circuit packaging, technology, cost and system performance often result in the implementation of shared buses for the transfer of information such as data, commands or other messages. In systems that utilize high speed parallel buses which interconnect several devices of similar function and bus priority, it is necessary that each device be given sufficient allocation in bus access to balance bus utilization, i.e., bandwidth. For optimum operation, it is also necessary that the average wait time for all devices in accessing the bus be as small as possible. It is further necessary for optimum performance that the arbitration mechanism which determines priority in access to the shared bus be as fast as possible, particularly in terms of logic level transitions, to calculate the next device grant.

Prior art techniques for selecting the processor for access to the bus have generally involved the use of discrete combinatorial and sequential logic elements and have therefore been highly complex and cumbersome in use. Further, such prior art techniques are relatively inflexible in operation, thus limiting the ability of such systems to accommodate for particular contingencies. For example, in many systems, the routine priority scheme may be upset by special memory requests, such as a multi-cycle request where the requesting processor requires a memory access involving more than a single memory cycle. Other special priority requests include "super priority" requests such as memory refresh cycles which must be performed to the exclusion of all other memory accesses. The prior art techniques employing discrete components cannot easily accommodate such non-routine memory requests without involving highly complex circuitry.

Conventional bus arbitration schemes generally implement a fixed, unchanging priority scheme among the using devices. Non programmable hardware logic generates bus use grant signals as a function of the incoming request signals in a fixed and unchanging priority structure. Such schemes are inflexible because the priority structure is built into the logic hardware and there is no way, short of redesigning the arbitration circuit, to accommodate different applications or changing system configurations and request loads.

The prior art has sought to alleviate these limitations by providing programmable arbitration mechanisms in which the relative priority ordering of the using devices is indicated by the contents of storage devices, such as registers, and hence may be changed by reprogramming the register contents.

While providing programmability at one level, these mechanisms have not met the needs of multiprocessor computer systems and other bus-oriented digital systems that require flexible, programmable, class-oriented priority schemes. In such systems, using devices are commonly divided into classes, with each class having a different priority, while devices within a class have the same priority and are generally scheduled to access the bus in a round-robin, equal opportunity, manner. The prior art programmable arbitration mechanisms have traditionally not possessed the flexibility necessary to adapt to such a variety and combination of priority determining manners. Hence the prior art mechanisms have not been capable of meeting the changing needs of a variety of arbitrator applications, configurations of using devices and device response time requirements.

Typical multiprocessor environments employ a common backplane bus to connect a plurality of processors. To interrupt a central processor each device must send an interrupt signal to the processor. Due to packaging constraints dedicated interrupt lines are at a premium. Many interrupt schemes have been implemented in the past to control the accessing of data in a computerized system. Fixed, as well as programmable, priority interrupt systems are available. As data acquisition rates increase with faster processors and the emergence of 32-bit processors, faster priority interrupt schemes are needed. To save dedicated interrupt lines and the associated integrated circuit pinouts, what is needed is a bus interrupt technique that uses the backplane bus. A device desiring access to the bus interrupts by first broadcasting its priority onto the bus and then sending an interrupt message.

Also common in the prior art in a centralized arbitration scheme, where a central arbitrator determines which module will receive the bus use next. This is the conventional way and has the disadvantage of a single point of failure (that is, when the centralized arbitrator fails, everything stops). This is unacceptable in fault tolerance systems, like space projects, banking, and critical industrial processes which can not use a centralized arbitration scheme.

What is needed is a distributed programmable priority scheme to solve the problems encountered in the prior art.

OBJECTS OF THE INVENTION

It is therefore and object of the invention to provide a programmable priority scheme.

It is further object of the invention to provide a distributed arbitration scheme wherein individual communications modules vie for a common bus.

It is still a further object to provide a distributed programmable priority scheme using no additional interrupt lines.

It is yet a further object of the invention to provide an arbitration scheme which is compatible with various integrated circuit device technologies.

SUMMARY OF THE INVENTION

These and other objects, feature and advantages of the invention are accomplished by a distributed arbitration scheme for a communication bus wherein a plurality of bus interface modules decide among themselves who should be granted use of the bus next. The protocol is a common microprocessor backplane bus interface for supporting multiprocessing, shared memory, memory mapping and input/output operations. The protocol features programmable priority which can be changed during bus system operation. The scheme handles interrupts over the bus and therefore eliminates separate interrupt lines. The scheme can be implemented in CMOS technology and is compatible with other integrated circuit device technologies.

BRIEF DESCRIPTION OF THE DRAWINGS

FIG. 3a is a schematic of the combinatorial logic used to derive prior and FIG. 3b is a logic truth table for determining priority.

FIG. 4a, b c and d are circuit schematics of the drive signal generation for a communications bus.

DETAILED DESCRIPTION OF THE INVENTION

Figure 1:
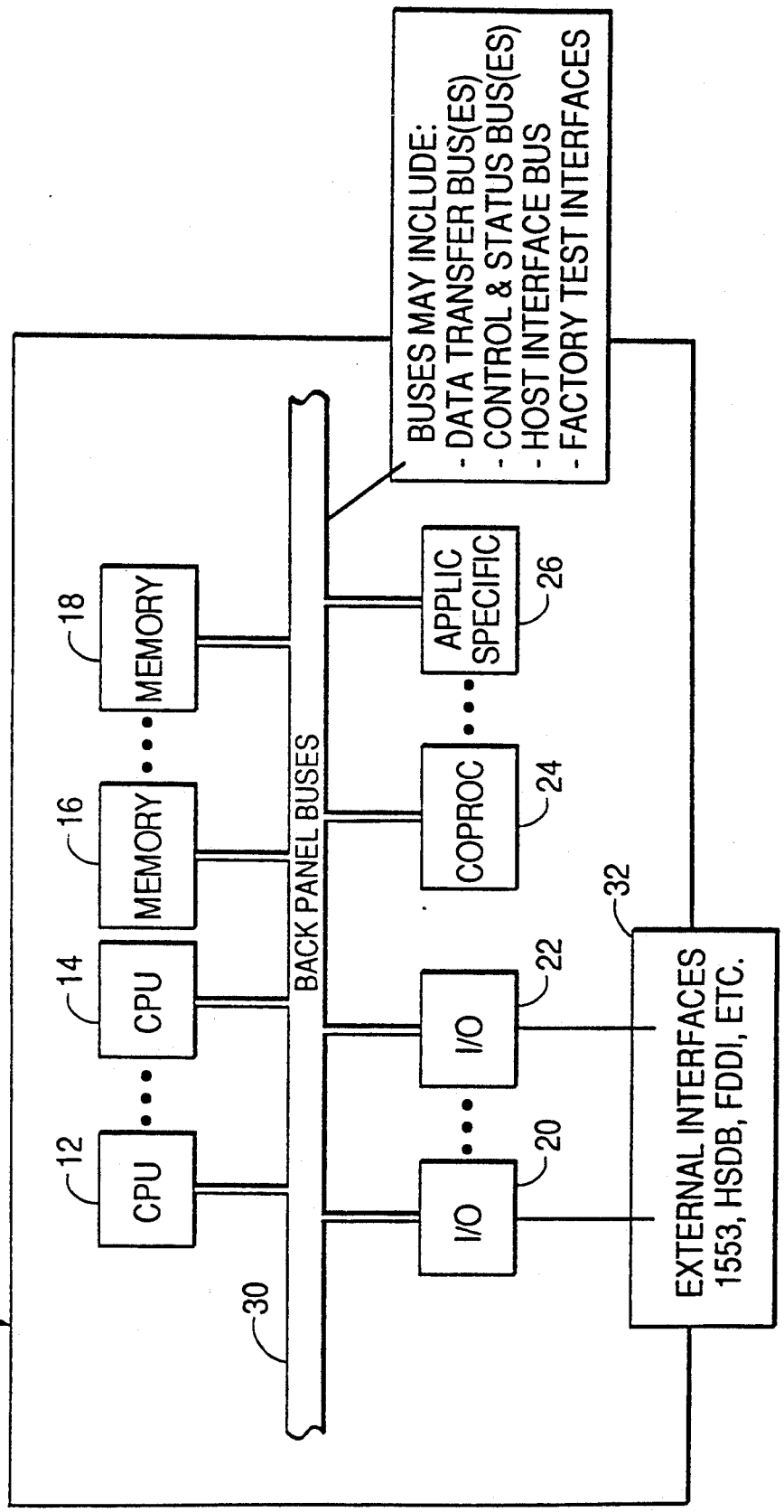
FIG. 1 is block diagram of a typical microprocessor environment.

Typically microprocessors operate in a multiprocessor environment, where the priority of a given processor at a particular time is determined by what task that processor is performing. Since tasks can be assigned to the processors on a dynamic basis, priorities can change with task and during time. The block diagram of FIG. 1 shows a typical multiprocessor environment formed by a computer system 10 containing CPU's 12, and 14, memory devices shown as 16 and 18, input/output devices 20 and 22, co-processor 24 and application specific device 26, attached to a tightly coupled backpanel bus 30, external interfaces 32 are connected to the input/output devices. The bus 30 may include data transfer functions, control or status functions, host interface functions and factory test interfaces.

Figure 2:
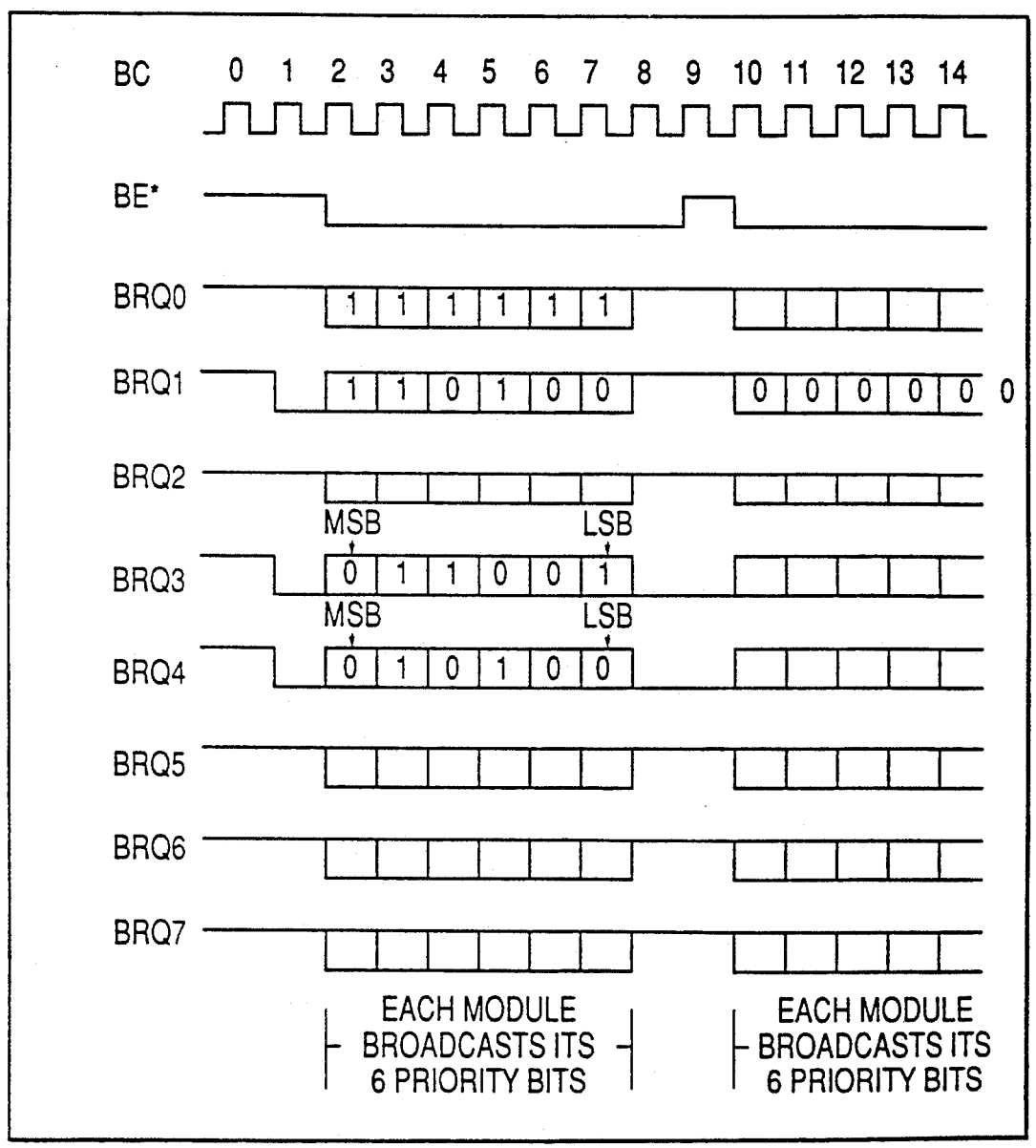
FIG. 2 is a timing diagram for an eight device distributed programmable priority arbitration scheme according to the present invention.

The invention is illustrated by the timing diagram of FIG. 2 which shows 8 bus interface unit modules connecting computer devices to the backpanel bus 30. In cycle 0 the bus is not used. No module is asserting its bus request line (BRQ). Likewise, no module asserts the bus engaged line BE*. In the following cycle, cycle 1, modules 1, 3, and 4 attempt to gain control of the bus by asserting their BRQ lines. A unique BRQ line is assigned to each module. A module requests the bus by asserting its BRQ line with all other modules receiving notification that a bus request has been made.

The bus request signals on BRQ1, BRQ3, and BRQ4 are received by all the modules. Each module processes these signals to determine which module has the highest priority. Each module is aware of the priority of all other modules hence, all modules will make the same decision as to which module should receive priority for use of the bus. In FIG. 2 its assumed that module 1 has the highest priority, therefore, module 1 gains control of the bus during cycle 1.

In cycle 2, module 1 asserts the bus engaged line BE* to indicate that the bus is now busy. Each module, including module 1 begins to broadcast its priority bits on its unique BRQ line. For instance, module 1 broadcasts its priority bits on BRQ1, as illustrated in FIG. 2. Six priority bits are shown for illustration purposes. The actual number of priority bits will be determined by the application of the system. It should be noted that each module can change its priority bits from transaction to transaction. For example, the six priority bits beginning at cycle 2 may differ from the six priority bits beginning at cycle 10.

FIG. 2 shows only the arbitration lines. Other possible lines, such as address/data lines, are not shown. While the modules are broadcasting their priority bits on the arbitration lines, the current master or module that has priority for use of the bus line, that is in this case module 1, uses the other bus lines to carrying out its bus transaction. For example, this could be reading a cache memory line from a global memory module. Thus, the broadcasting of priority bits does not interfere with normal bus transactions making this distributed programmable arbitration scheme very efficient.

In cycles 3 through 7 the modules broadcast their priority bits over their respective BRQ lines as illustrated in FIG. 2. The current master, module 1, continues its transaction on the other bus lines.

In cycle 8 after broadcasting of priority bits is completed, any module which needs to use the bus next will assert its BRQ line. As shown in FIG. 2, only modules 3 and 4 need to use the bus, so only BRQ3 and BRQ4 are asserted in cycle 8. Module 1 has control of the bus as it continues its transaction until it is complete. For this illustration let us assume that the module 1 transaction is completed in this cycle.

Beginning in cycle 9, module 1 releases its BE* line to indicate that the bus is now free. Modules 3 and 4 compete for the bus, using the priority bits that were broadcast in cycles 2 through 7. Assuming that module 3 has a higher priority, then module 3 gains control over the bus. In cycle 10, module 3 asserts the BE* line to indicate that the bus is now busy. All modules start to broadcast their priority bits which may have been changed by programming dynamically during system operation. A new bus transaction period then starts the count.

To implement the invention, protocol processing is done within each module to determine, from the received priority bits, whether it has a higher priority than another module. For instance, as illustrated in FIG. 2, module 3 receives priority bits from module 4 during cycles 2 through 7. Module 3 needs to decide, by the end of cycle 8, whether it has a higher priority than module 4. This takes only an exclusive OR gate and a 1-bit latch, called a priority latch, to make this decision. During cycle 2, the first priority bit X from module 4 and the first priority bit Y for module 3 are exclusive ORed as shown in FIG. 3a. There are two cases:

Case 1, the output of the exclusive OR gate 40 is equal to 0. Therefore modules 3 and 4 have equal priority at their first bit (the most significant bit). No decision can be made as to priority level between 3 and 4. Continuing to the next cycle, the second most significant bit is compared.

Here modules 3 and 4 do not have equal priority, the exclusive OR gate 40 output is a 1 and this output is used to enable the priority latch to store X, the bit from module 4. Once we have a priority bit in the latch 44, further comparison is no longer needed. The value of X indicates which module has a higher priority. Here module 3 has a high priority than module 4. Continuing on, a priority decision can be reached by the end of 8 cycles. With N modules on the bus, each module contain N-1 simple circuits to make the priority decision.

For each module to determine whether it is the master for receipt of the bus during the next transaction, additional information must be determined. For instance, as illustrated in FIG. 2, during cycle 9, the bus engaged line BE* is high, indicating that the bus is free. Modules 3 and 4 are then able to compete for the bus. A module will be the next bus master if it requests the bus and has higher priority over other modules requesting the bus. Since these inputs are either on the BRQ lines or on the priority latches, a AND gate 46, and inverters 48, 50 are used within each module to determine if that module will be the next bus master.

A typical driver for a communication's bus is a bipolar open collecter driver as shown in FIG. 4A. Shown is a voltage power supply 50 which powers the bus through termination resistance 52. In each bus interface module 54, 56 and 58 are opened bipolar collector drivers. This produces a logical NOR gate shown in FIG. 4B. For space applications, open collector drivers can not be used because of the large power requirement of 70 milliamperes per driver and because the open collector driver scheme is not radiation hard. What is needed is a CMOS driver because of its low power and radiation hardness.

As shown in FIG. 4C, simply using CMOS transistors as the communications bus drivers causes a diagonal driving problem through transistors 64 and 66 or 68 and 70. This will act like a short circuit and may damage the transistors.

A solution to this driving problem is shown in FIG. 4D which shows the BRQ0 line 80. Connected to the BRQ0 line are termination resistance 82 and modules 0, 1, 2-7. Each module uses an inverter 84 as its driver which prevents any diagonal driving problem yet provides high gain, low power, and radiation hardened devices.

What is shown is a programmable distributed priority arbitration scheme which eliminates interrupt lines and can use various integrated circuit device technology such as CMOS.

Although a specific embodiment have been disclosed, it would be understood that those having skill in the art, changes can be made to the specific embodiment without departing from the spirit that is coupling the invention.

What is claimed is:

1. In a system including a common bus and a plurality of users connected to said common bus, and in which each user of said plurality of users includes means for providing a request signal indicating that said user is a requesting user requiring access to said common bus, a method of determining priority comprising the steps of:

each user requiring access to the bus sending a bus request signal;

each user requesting access to the bus sending its priority level bits to each other requesting user during successive clock cycles starting with the most significant priority bits;

each requesting user comparing by exclusive ORing its priority level bits to the priority bits of each other requesting user and storing the resulting value in a priority latch;

each requesting user determining from the value stored in the priority latch its priority in relation to each other requesting user; and the requesting user with the highest priority level receiving access to the bus when next available.

2. In a system including a common bus and a plurality of users connected to said common bus, and in which each user of said plurality of users includes means for providing a request signal indicating that said user is a requesting user requiring access to said common bus, an apparatus for determining priority in access to said common bus, comprising:

signal means associated with each user to transmit to each other user its priority bits;

comparison means comprising exclusive OR logic to determine the highest priority user and storing the results in a priority latch; and means for granting access to the highest priority user requiring access to the bus based on the stored value and the presence of a bus request signal.

3. The apparatus of claim 2 wherein CMOS integrated circuit drivers are used to drive signals to the bus.

* * * * *